(12) United States Patent
Stein et al.

(10) Patent No.: US 11,854,272 B2
(45) Date of Patent: Dec. 26, 2023

(54) HAZARD DETECTION FROM A CAMERA IN A SCENE WITH MOVING SHADOWS

(71) Applicant: MOBILEYE VISION TECHNOLOGIES LTD., Jerusalem (IL)

(72) Inventors: Gideon Stein, Jerusalem (IL); Erez Dagan, Jerusalem (IL)

(73) Assignee: MOBILEYE VISION TECHNOLOGIES LTD., Jerusalem (IL)

(*) Notice: Subject to any disclaimer, the term of this patent is extended or adjusted under 35 U.S.C. 154(b) by 455 days.

(21) Appl. No.: 17/207,206

(22) Filed: Mar. 19, 2021

(65) Prior Publication Data

US 2021/0264176 A1 Aug. 26, 2021

Related U.S. Application Data

(63) Continuation of application No. 16/298,256, filed on Mar. 11, 2019, now Pat. No. 10,956,756, which is a
(Continued)

(51) Int. Cl.
| | | |
|---|---|---|
| *G06V 20/58* | (2022.01) | |
| *G06T 7/246* | (2017.01) | |
| *G06V 20/56* | (2022.01) | |
| *G06T 7/40* | (2017.01) | |
| *H04N 7/18* | (2006.01) | |

(52) U.S. Cl.
CPC .............. *G06V 20/58* (2022.01); *G06T 7/248* (2017.01); *G06T 7/40* (2013.01); *G06V 20/588* (2022.01); *H04N 7/183* (2013.01); *G06T 2207/10016* (2013.01); *G06T 2207/30256* (2013.01); *G06T 2207/30261* (2013.01)

(58) Field of Classification Search
CPC ................................. G06T 7/248; G06T 7/40
See application file for complete search history.

(56) References Cited

U.S. PATENT DOCUMENTS

| | | |
|---|---|---|
| 6,762,769 B2 | 7/2004 | Guo et al. |
| 7,113,867 B1 | 9/2006 | Stein |
| (Continued) | | |

OTHER PUBLICATIONS

McCall et al., "An integrated, robust approach to lane marking detection and lane tracking." Intelligent Vehicles Symposium, 2004 IEEE. IEEE, 2004.
(Continued)

*Primary Examiner* — Sam Bhattacharya
(74) *Attorney, Agent, or Firm* — Finnegan, Henderson, Farabow, Garrett & Dunner, LLP

(57) ABSTRACT

Computerized methods are performable by a driver assistance system while the host vehicle is moving. The driver assistance system includes a camera connectible to a processor. First and second image frames are captured from the field of view of the camera. Corresponding image points of the road are tracked from the first image frame to the second image frame. Image motion between the corresponding image points of the road is processed to detect a hazard in the road. The corresponding image points are determined to be of a moving shadow cast on the road to avoid a false positive detection of a hazard in the road or the corresponding image points are determined not to be of a moving shadow cast on the road to verify detection of a hazard in the road.

15 Claims, 10 Drawing Sheets

Related U.S. Application Data continuation of application No. 15/867,550, filed on Jan. 10, 2018, now Pat. No. 10,262,216, which is a continuation of application No. 14/737,522, filed on Jun. 12, 2015, now Pat. No. 9,892,328.

(60) Provisional application No. 62/013,562, filed on Jun. 18, 2014.

(56) References Cited

U.S. PATENT DOCUMENTS

| | | |
|---|---|---|
| 7,720,580 B2 | 5/2010 | Higgins-Luthman |
| 8,886,387 B1 | 11/2014 | Agarwal et al. |
| 2005/0152580 A1 | 7/2005 | Furukawa et al. |
| 2007/0221822 A1 | 9/2007 | Stein et al. |
| 2008/0266396 A1 | 10/2008 | Stein |
| 2009/0284597 A1 | 11/2009 | Nakamori |
| 2012/0140988 A1 | 6/2012 | Takahashi |
| 2012/0200707 A1 | 8/2012 | Stein et al. |
| 2013/0070095 A1 | 3/2013 | Yankun et al. |
| 2014/0022378 A1 | 1/2014 | Higgins-Luthman |
| 2014/0037142 A1 | 2/2014 | Bhanu et al. |
| 2014/0161323 A1 | 6/2014 | Livyatan et al. |
| 2014/0169627 A1 | 6/2014 | Gupta |

OTHER PUBLICATIONS

McCall et al., "Performance evaluation of a vision based lane tracker designed for driver assistance systems." Intelligent Vehicles Symposium, 2005. Proceedings. IEEE. IEEE, 2005.

Handmann et al., "An image processing system for driver assistance." Image and Vision Computing 18.5 (2000): 367-376.

Fang et al., "Automatic change detection of driving environments in a vision-based driver assistance system." Neural Networks, IEEE Transactions on 14.3 (2003): 646-657.

Nadimi et al., "Physical models for moving shadow and object detection in video." PatternAnalysis and Machine Intelligence, IEEE Transactions on 26.8 (2004): 1079-1087.

Kaewtrakulpong et al., "An improved adaptive background mixture model for real-timetracking with shadow detection." Video-based surveillance systems. Springer US, 2002. 135-144.

McCall et al., Video-based lane estimation and tracking for driver assistance: survey, system and evaluation. Intelligent Transportation Systems, IEEE Transactions on 7.1 (2006): 20-37.

Prati et al., "Detecting moving shadows: algorithms and evaluation" Pattern Analysis and Machine Intelligence, IEEE Transactions on 25.7 (2003): 918-923.

Rattei et al., "Shadow-based vehicle model refinement and tracking in advanced automotivedriver assistance systems." Embedded Systems for Real-Time Multimedia (ESTIMedia), 2011 9th IEEE Symposium on. IEEE, 2011.

Prati et al., "Shadow detection algorithms for traffic flow analysis: a comparative study" Intelligent Transportation Systems, 2001. Proceedings. 2001 IEEE. IEEE, 2001.

Mori et al., "Shadow and rhythm assign patterns of obstacle detection." Industrial Electronics, 1993. Conference Proceedings, ISIE '93-Budapest., IEEE International Symposium on. IEEE, 1993.

European Search Report, European Patent Office, App. No. EP15275152.5, dated Dec. 8, 2015.

Satzoda et al., "Vision-based lane analysis: Exploration of issues and approaches for embedded realization." Proceedings of the IEEE Conference on Computer Vision and Pattern Recognition Workshops. 2013.

Sivaraman et al., "Active learning based robust monocular vehicle detection for on-roadsafety systems" Intelligent Vehicles Symposium, 2009 IEEE. IEEE, 2009.

U.S. Appl. No. 60/638,687.

Mikic et al., "Moving shadow and object detection in traffic scenes." Pattern Recognition, 2000. Proceedings. 15th International Conference on. vol. 1. IEEE, 2000.

Lin et al, "A robust lane detection and verification method for intelligent vehicles", Intelligent Information Technology Application, 2009. IITA 2009. Third International Symposium on. vol. 1. IEEE, 2009.

European Search Report dated Apr. 26, 2016 for EP Application No. 15275152.5 (16 pages).

Lin et al., "An Efficient and Robust Moving Shadow Removal Algorithm and its Applications in ITS", Eurasip Journal on Advances in Signal Processing, vol. 2010, No. 1, Jun. 8 2010 (19 pages).

HAZARD DETECTION FROM A CAMERA IN A SCENE WITH MOVING SHADOWS

CROSS REFERENCE TO RELATED APPLICATIONS

The present application is a continuation of U.S. patent application Ser. No. 16/298,256, filed Mar. 11, 2019, which is a continuation of U.S. patent application Ser. No. 15/867,550, filed Jan. 10, 2018, issued as U.S. Pat. No. 10,262,216, which is a continuation of and claims priority to U.S. patent application Ser. No. 14/737,522, filed Jun. 12, 2015, issued as U.S. Pat. No. 9,892,328, which claims priority from U.S. provisional patent application 62/013,562 filed 18 Jun. 2014. All referenced applications are incorporated herein by reference in their entirety.

BACKGROUND

1. Technical Field

The present invention relates to processing image motion from a moving camera mounted in a host vehicle for detection of hazards.

2. Description of Related Art

During the last few years camera based driver assistance systems (DAS) have been entering the market; including lane departure warning (LDW), automatic high-beam control (AHC), traffic sign recognition (TSR), forward collision warning (FCW) and pedestrian detection.

A core technology behind forward collision warning (FCW) systems and headway distance monitoring is detection and class-based recognition including vehicles and pedestrians. A key component of a typical forward collision warning (FCW) algorithm is the estimation of distance from a camera and the estimation of scale change from the time-to-contact/collision (TTC) as disclosed for example in U.S. Pat. No. 7,113,867.

Reference is now made to FIGS. 1 and 2 which illustrate a driver assistance system (DAS) 16 including a camera or image sensor 12 mounted in a vehicle 18. Image sensor 12, imaging a field of view in the forward direction provides image frames 15 in real time which are captured by an image processor 30. Processor 30 may be used to process image frames 15 simultaneously and/or in parallel to serve a number of driver assistance systems/applications. By way of example in FIG. 2, image frames 15 are used to serve pedestrian detection 20, lane departure warning (LDW) 21, forward collision warning (FCW) 22. Processor 30 may be used to process image frames 15 to detect and recognize an image of an object, e.g. vehicle or pedestrian, in the forward field of view of camera 12. Lane departure warning (LDW) 21 may provide a warning in the case of unintentional lane departure. The warning may be given when the vehicle crosses or is about to cross the lane marker. Driver intention is determined based on use of turn signals, change in steering wheel angle, vehicle speed and brake activation. Driver assistance system (DAS) 16 also includes real time hazard detection 23 by sensing the vertical deviation of the contour of the road or deviation from the road plane such as according to teachings of US patent application publication US20150086080. Driver assistance system (DAS) 16 may be implemented using specific hardware circuitry (not shown) with on board software and/or software control algorithms in storage 13. Image sensor 12 may be monochrome or black-white, i.e. without color separation or image sensor 12 may be color sensitive. In some cases, image frames 15 are partitioned between different driver assistance applications and in other cases the image frames 15 may be shared between the different driver assistance applications.

Reference is now made to FIG. 3 which illustrates camera or pinhole projection which relates a point P(X,Y,Z) in world space Cartesian coordinates to a point p(x,y) image coordinates on image plane 15 where X is the horizontal Cartesian coordinate in world space, Y is the vertical Cartesian coordinate in world space and Z is the direction along the optical axis of camera 12. The origin O of camera projection is at the pinhole, image plane 15 is in reality is behind the origin at focal length f with the image inverted. Image plane 15 is shown in the projection of FIG. 3 in a symmetric position with a non-inverted image in front of origin O at a distance focal length f. The equations that follow, approximate the relation between image coordinates x, y and world space coordinates X, Y, Z assuming camera or pinhole projection.

$$x = f\frac{X}{Z} \quad (1)$$

$$y = f\frac{Y}{Z} \quad (2)$$

The term "homography" as used herein refers to an invertible transformation from a projective space to itself that maps straight lines to straight lines. In the field of computer vision, two images of the same planar surface in space are related by a homography assuming the pinhole camera model.

Structure-from-Motion (SfM) refers to methods for recovering three-dimensional information of a scene that has been projected onto the back focal plane of a camera. The structural information derived from a SfM algorithm may take the form of a set of projection matrices, one projection matrix per image frame, representing the relationship between a specific two-dimensional point in the image plane and its corresponding three-dimensional point. SfM algorithms rely on tracking specific image features from image frame to image frame to determine structural information concerning the scene.

Reference is now made to FIG. 4, a flow chart showing details of processing of image motion or Structure-from-Motion (SfM) algorithm, according to US patent application publication US20150086080. US patent application publication US20150086080 is incorporated herein by reference as if fully set forth herein.

It is assumed that a road can be modeled as an almost planar surface. Thus imaged points of the road move in image space according to a homography.

In particular, by way of example, for a given camera 12 height (1.25 m), focal length (950 pixels) and vehicle motion between frames (1.58 m), it may be possible to predict the image motion of selected corresponding points on the road plane between the two image frames 15a and 15b respectively as host vehicle 18 moves forward. Using a model of the almost planar surface for the motion of the road points, it is possible to warp the second image 15b towards the first image 15a. Thus, in step 501, image frame 15b is initially warped into image frame 15a. (In a similar process, image frame 15a may be initially warped into image frame 15b).

Instead of trying to find feature points, which would invariably give a bias towards strong features such as lane marks and shadows, a fixed grid of points is used for tracking (step 507). A grid of points is selected (step 503) from a region, e.g. trapezoidal, that roughly maps up to 15 meters ahead and one lane in width. Points may be spaced every 20 pixels in the horizontal (x) direction and 10 pixels in the vertical (y) direction. An alternative would be to randomly select points according to a particular distribution.

Around each point in image 15a a patch is located (step 505). The patch may be 8 pixels in each direction centered around the point resulting in a 17×17 pixel square. The normalized correlation is then computed (e.g. Matlab™ function normxcorr2) for warped image 15b, where the patch center is shifted in the search region. In practical use system 16 may include be a yaw sensor but no pitch sensor and so a tighter search region may be used in the x direction rather than in the y direction. A search region of (2×4+1) pixels in the x direction may be used and (2×10+1) pixels in the y direction.

The shift which gives the maximum correlation score is found and may be followed by a refinement search around the best score position with a sub-pixel resolution of 0.1 pixels. Invalid tracks may be filtered out at the search stage by picking those points with a score above a threshold (e.g. T=0.7) leaving tracked points 509 as a result of tracking (step 507) and that the reverse tracking from warped image 15b to image 15a gives a similar value in the opposite direction. Reverse tracking is similar to left-right validation in stereo.

Tracked points 509 as a result of tracking step 507, are fit to a homography (step 511) using RANdom SAmple Consensus (RANSAC). A number, e.g. four, of points are chosen at random and used to compute the homography. Points 509 are then transformed using the homography and the number of points which are closer than a threshold are counted. Randomly choosing 4 points and counting the number of points which are closer than a threshold may repeated many times and the four points that gave the highest count are retained.

At the end of process 40, the four best points are used to again (step 513) transform the points and all the points (inliers) that are closer than a (possibly different) threshold are used to compute a homography using least squares. The rest of the points that are not closer than a (possibly different) threshold are considered outliers.

AI this point in process 40, the number of inliers and their spread in the warped image give an indication to the success of finding the road plane model. It is usual to get over 80% inliers and a good fit. The homography can then be used to correct the initial alignment for warping (step 501). Correction of the initial alignment can be done by integrating the correction into the initial warp (step 501) or to do two warps consecutively. The former is advantageous as it requires only one interpolation step and can be performed optionally by matrix multiplication of the two homography matrices.

After warping image 15b towards image 15a to give warped image, using the refined warp (step 513), the tracking of points (step 507) may be repeated using a finer grid (e.g. every 5th pixel on every 5th row) and over a wider region of the road. Since the road plane is very well aligned, a smaller region may be searched over such as 2 pixels in each direction, again, with a subpixel search.

Using an image flow analysis between tracked image points 509 as described in US20150086080 or other optical flow analysis algorithms, points on the road have a characteristic positive image flow as host vehicle 18 moves forward. Positive image flow is defined as flow away from the focus of expansion (FOE) (generally speaking down and outwards in image frames 15).

Object points in world space above the road plane such as an elevated sidewalk have an image flow greater than the characteristic image flow of tracked points 509 of the road. Object points in world space below the road plane such as sunken manhole covers, have an image flow less than the characteristic image flow of tracked points 509 of the road.

Using the image flow analysis between tracked image points 509 as described in US20150086080, image flow of tracked points 509 is compared with the expected image flow of the modeled road plane and any differences or residual image flow are associated with vertical deviation in the road. Tracked image points 509 of objects above the road plane have residual image flow greater than zero and objects below the road plane have residual image flow below zero.

BRIEF SUMMARY

Various driver assistance systems mountable in a host vehicle and computerized methods performable by the driver assistance systems are provided for herein while the host vehicle is moving. The driver assistance systems include a camera operatively connectible to a processor. First and second image frames are captured from the field of view of the camera. Corresponding image points of the road are tracked from the first image frame to the second image frame. Image motion between the corresponding image points of the road is processed to detect a hazard in the road. The corresponding image points are determined to be of a moving shadow cast on the road to avoid a false positive detection of a hazard in the road and/or the corresponding image points are determined not to be of a moving shadow cast on the road to verify detection of a hazard in the road, by at least one of:

(i) hypothesizing that the image motion is consistent with a hypothetical static object in the road, projecting a bottom edge on the road plane of the hypothesized static object onto the image frames, rejecting the hypothesis that the image motion is caused by a static object in the road if there is no strong horizontal texture at the hypothesized projected bottom edge of the static object or if the texture of hypothesized bottom edge of the static object is changing over the image frames to confirm that the image motion is caused by the moving shadow, or confirming the hypothesis that the image motion is caused by a static object in the road if there is a strong horizontal texture at the hypothesized projected bottom edge of the static object and if the texture of hypothesized bottom edge of the static object is fixed over the image frames;

(ii) recognizing in the image frames images of a moving vehicle and associating the image motion between the corresponding image points of the road with the images of a moving vehicle to determine that the image motion between the corresponding image points of the road is due to a moving shadow cast from the moving vehicle. It may be hypothesized that that the image motion is due to a hypothetical moving shadow cast from the moving vehicle. Respective distances may be computed in the image frames to the hypothetical moving shadow and the distances to the hypothetical moving shadow may be matched with distances to the moving vehicle to confirm the hypothesis that the image motion is due to the moving shadow cast from the moving vehicle. Alternatively or in addition, the relative speed between the host vehicle and the moving vehicle may be determined. The image motion of points on the road may be calculated for the relative speed between the host vehicle and the moving vehicle. The image motion of the hypothetical moving shadow may be measured. The measured image motion of the hypothetical moving shadow may be compared to the calculated image motion for the relative speed between the host vehicle and the moving vehicle and it may be confirmed that the moving image points are on the moving shadow if the measured image motion closely matches the calculated image motion assuming the relative speed between the host vehicle and the detected vehicle.

(iii) associating image motion with a moving shadow when consistent with a static hazard in the road of height greater than a threshold height;

(iv) recognizing images of a lane mark in the road and associating image motion with a moving shadow by detecting the image motion superimposed over the images of the lane mark and/or associating image motion with a moving shadow when the image motion is similar on both sides of the images of the lane mark;

(v) providing location information of an object suspected to cast a moving shadow, finding lines in the image frames between the shadow and the image of the object and searching along the lines to correlate the image motion of the object suspected to cast a moving shadow and the image motion of the shadow;

(vi) verifying that the image motion is due to a moving shadow when the image motion is not aligned with the focus of expansion or when direction of the image motion changes sign.

(vii) performing texture analysis on an image of an object suspected to cast a moving shadow to determine if the image of the object has branch texture and/or leaf texture; and/or (viii) recognizing an image of a street lamp, verifying that the image motion is due to a moving shadow from the light of the street lamp by constructing lines between the image of the street lamp, the image of the tree casting the moving shadow and the moving shadow.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 7b shows tracked points on the road plane for shadows of the vehicle and the trailer illustrated in FIG. 7a;

DETAILED DESCRIPTION

Figure 1:
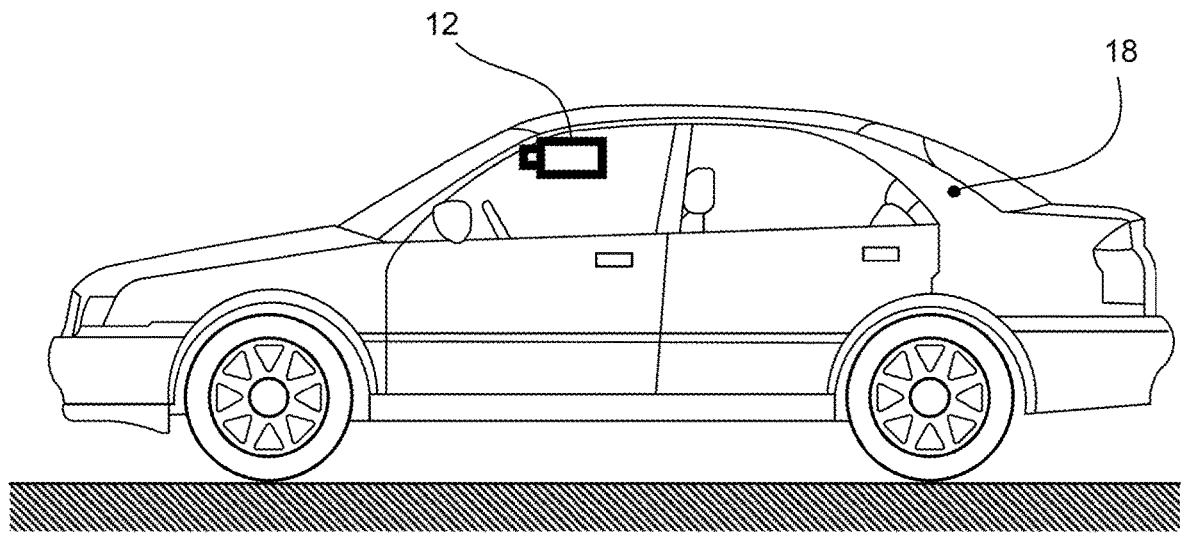
FIGS. 1 and 2 illustrate a system including a camera or image sensor mounted in a vehicle system.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

Figure 2:
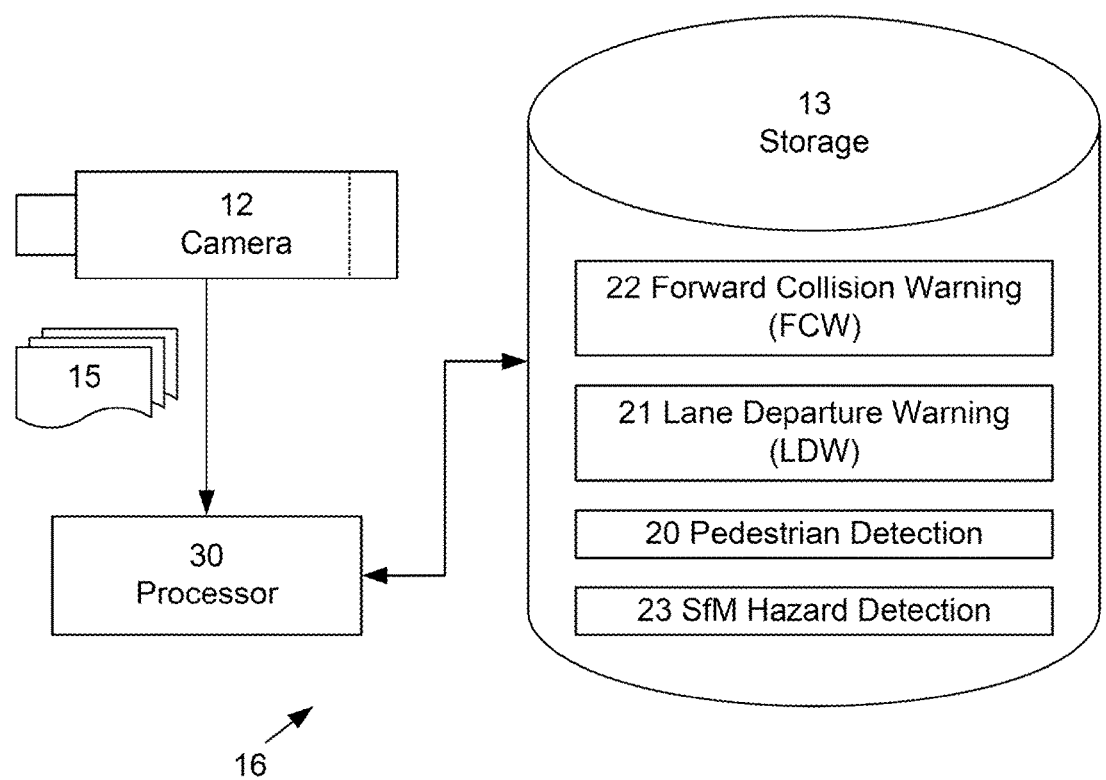
Figure 3:
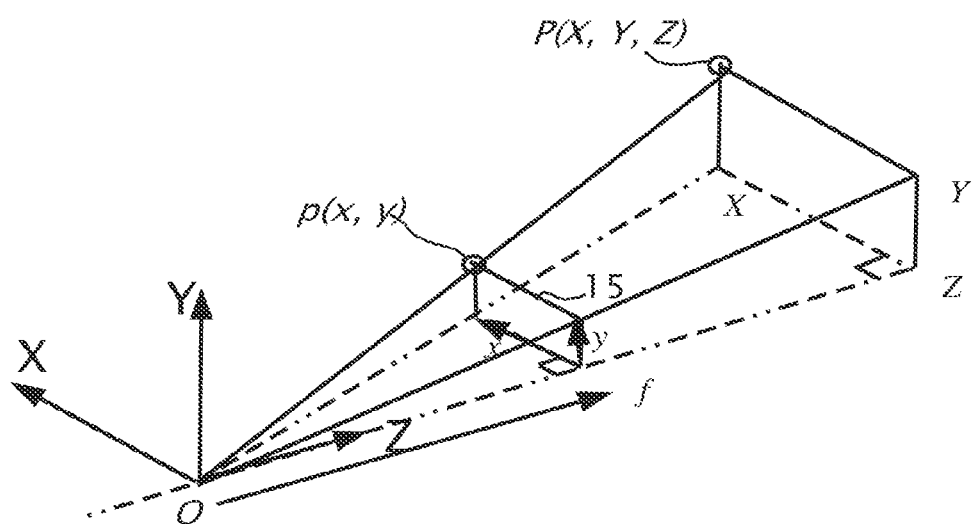
FIG. 3 illustrates camera or pinhole projection.
Figure 4:
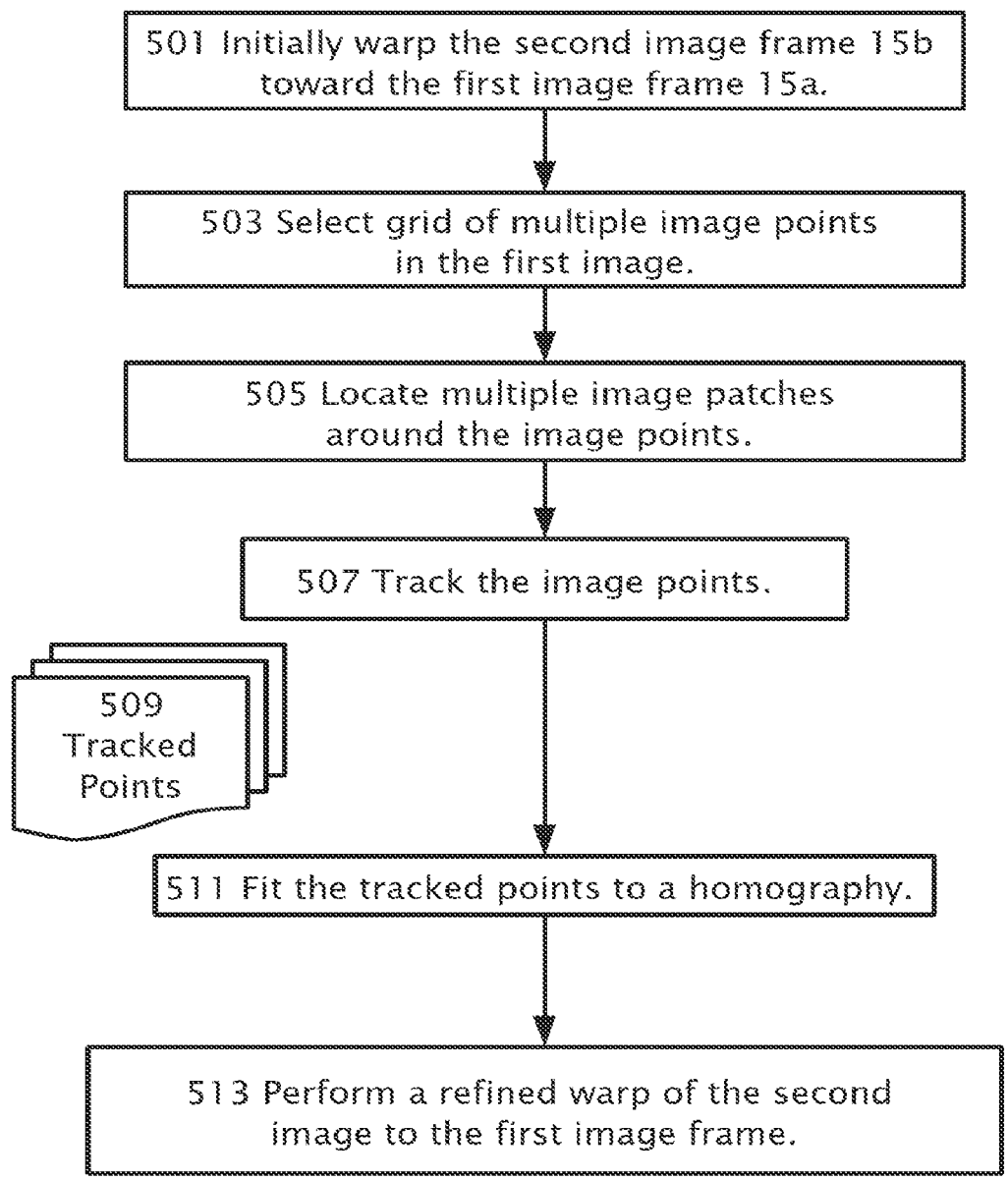
FIG. 4 illustrates a flow chart showing details of processing of image motion or Structure-from-Motion (SfM) algorithm, according to US patent application publication US20150086080.

By way of introduction, various embodiments of the present invention are useful to improve hazard detection 23 using structure from motion SfM algorithms in the presence of moving objects and moving shadows. Under an assumption that the road environment is rigid, image motion of a portion of the road plane may be predicted based on camera projection (equations 1 and 2) and the motion of the host vehicle. Image motion greater than that of the road plane appears in camera projection as an obstacle in the road with height above the road plane. Image motion less than that of the road plane appears in camera projection as a depression in the road. However, the real road environment is not rigid and there are moving objects which do not fit a rigid world assumption. The image motion of these moving objects/shadows cannot be used to derive unambiguously height from the road using structure-from-motion (SfM) algorithms such as the teachings of US20150086080 which do not explicitly account for motion of objects and shadows. System 16 algorithm 23 (FIG. 2) which detects hazards based on image motion may give false positive warnings. The image motion of these objects may warn of hazards that are not there, cause false alarms or worse, false braking of vehicle 18. Moving objects often create moving shadows on the road and these, as will be shown need to be considered. The description that follows is directed to various solutions to these problems.

Moving objects or shadows may affect the stage of determining a reference road plane (according to the teachings of US20150086080). However, image points, which are not moving as image points of the road plane are expected to move, are detected as outliers in the random sample consensus (RANSAC) process and are not expected to affect the reference road plane determination. If the outliers are too numerous, detecting of the reference plane will fail because the low inlier count indicates a failure. A threshold may be set if the inlier count drops below the threshold and an invalid flag may be raised. After a few frames of the inlier count being above the threshold, the reference plane determination may become valid again as the moving objects and/or shadows are out of the region of interest in images frames 15.

Moving objects normally found in the road environment include vehicles, bicycles and pedestrians. In most cases, these moving objects are detected by the DAS system 16 using class-based recognition techniques performed by forward collision warning FCW 22 and pedestrian detection 20 and thus image regions corresponding to these recognized objects may be masked out and ignored by hazard detection 23 which uses structure-from-motion techniques.

Objects moving in a general direction results in image flow that does not in general match the image flow of the rigid world. Thus, images of generally moving objects may be segmented out as hazards. In general, points on objects moving in the same direction as host vehicle 18 will also show up as hazards although there will be errors in estimation of height H of the candidate object and distance Z to the candidate object. It can be shown that for each height H of the point above the ground there will be one relative speed at which that point will appear to be a stationary point on the road and thus might not be segmented as a hazard. However, there is no one relative speed which "works" for two object points of different heights (H). Thus a moving object which normally has multiple heights cannot "hide" and is detected as a hazard.

Another issue is moving shadows on the road. The image flow of object points of moving shadows does not correspond to the image flow of the planar road surface. Thus, there is danger of mistaking moving shadows for hazards, e.g. depressions or bumps in the road profile. The first priority is to avoid false hazard detection due to moving shadows and the second priority is to determine the road profile of the road which include moving shadows which may appear to be hazards or bumps in the road profile.

Figure 5A:
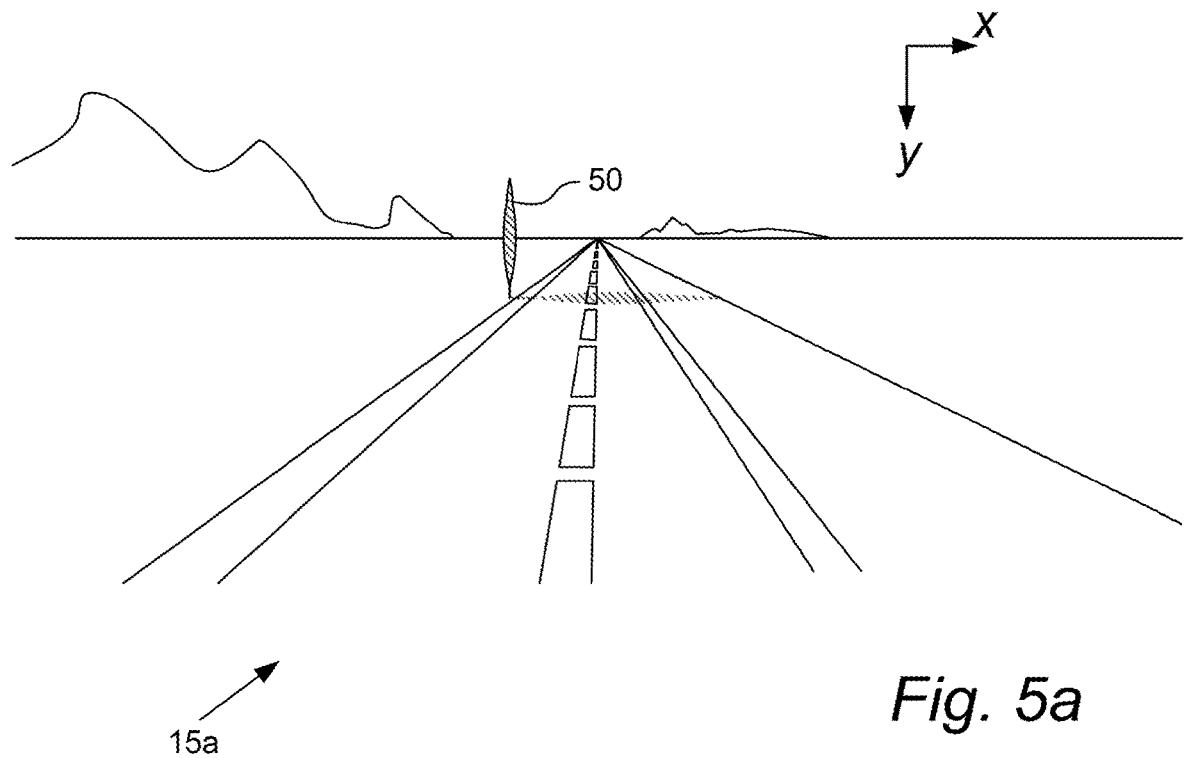
FIGS. 5a, and 5b illustrates road scenes of successive image frames captured from a camera mounted in a host vehicle, according to features of the present invention.
Figure 5B:
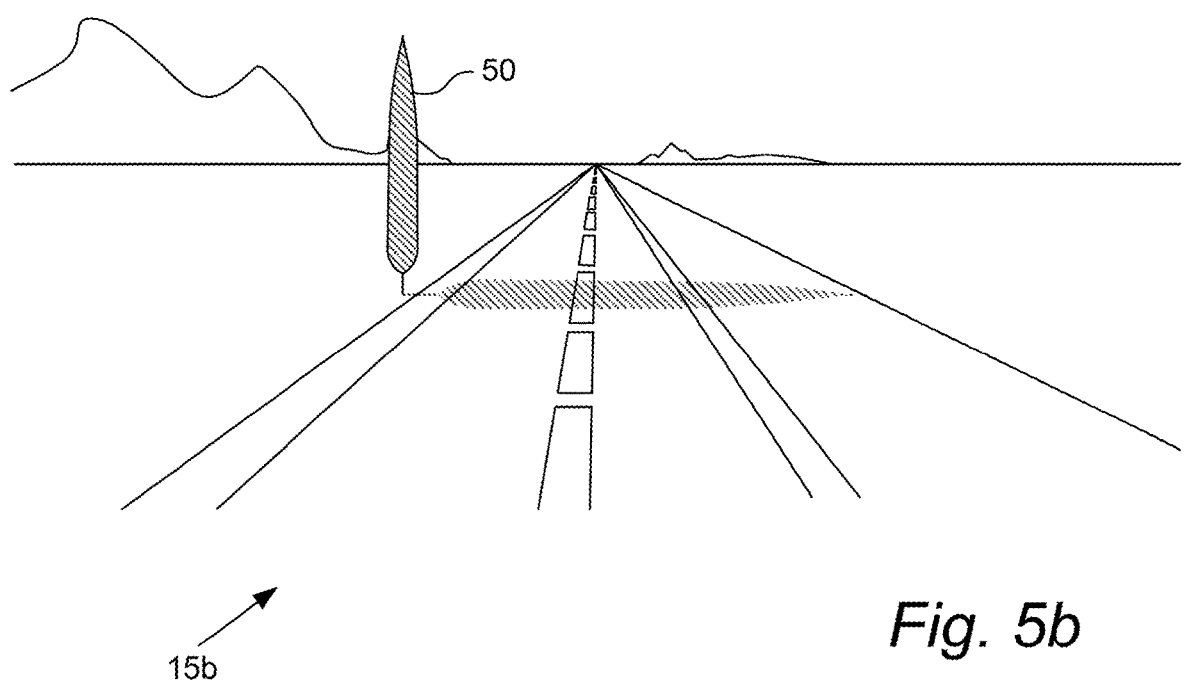

Reference is now made to FIGS. 5a, and 5b, which show road scenes of successive image frames 15 captured by processor 30 from camera 12 mounted in host vehicle 18, according to features of the present invention. Captured image frames 15a and 15b in FIGS. 5a and 5b respectively show a tree 50 and its shadow cast on the road surface as host vehicle 18 advances forward along the road. Tree 50 appears to be unmoving and the shadows of the tree appear to be static in the road as host vehicle 18 advances from a first position in which image frame 15a of FIG. 5a is captured to the second position in which image frame 15b of FIG. 5b is captured. Image motion of the tree shadow which may be measured in pixels in x,y directions in image space (Cartesian coordinate axes are shown in FIG. 5a) appears identical to image motion of the road plane between respective image frames 15 of FIGS. 5a and 5b. Thus, a structure-from-motion algorithm adapted to detect road hazards would not detect any hazard from the tree shadows of FIGS. 5a and 5b.

Figure 5C:
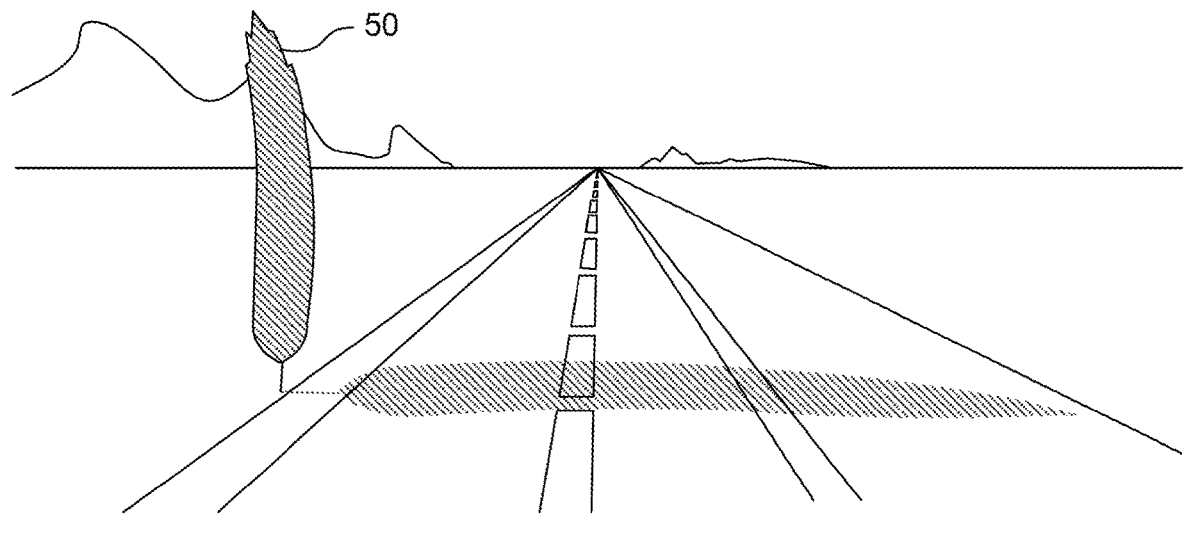
FIGS. 5c and 5d illustrate additional road scenes of successive image frames captured by from the camera mounted in the host vehicle, according to features of the present invention.
Figure 5D:
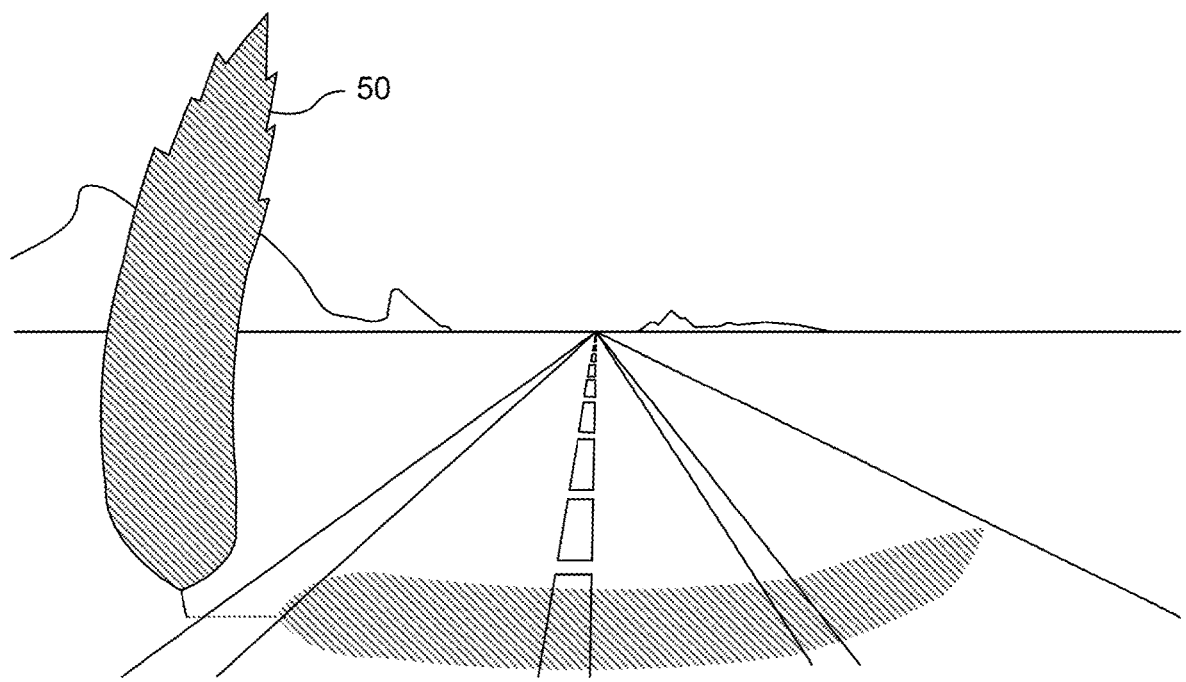
Figure 6:
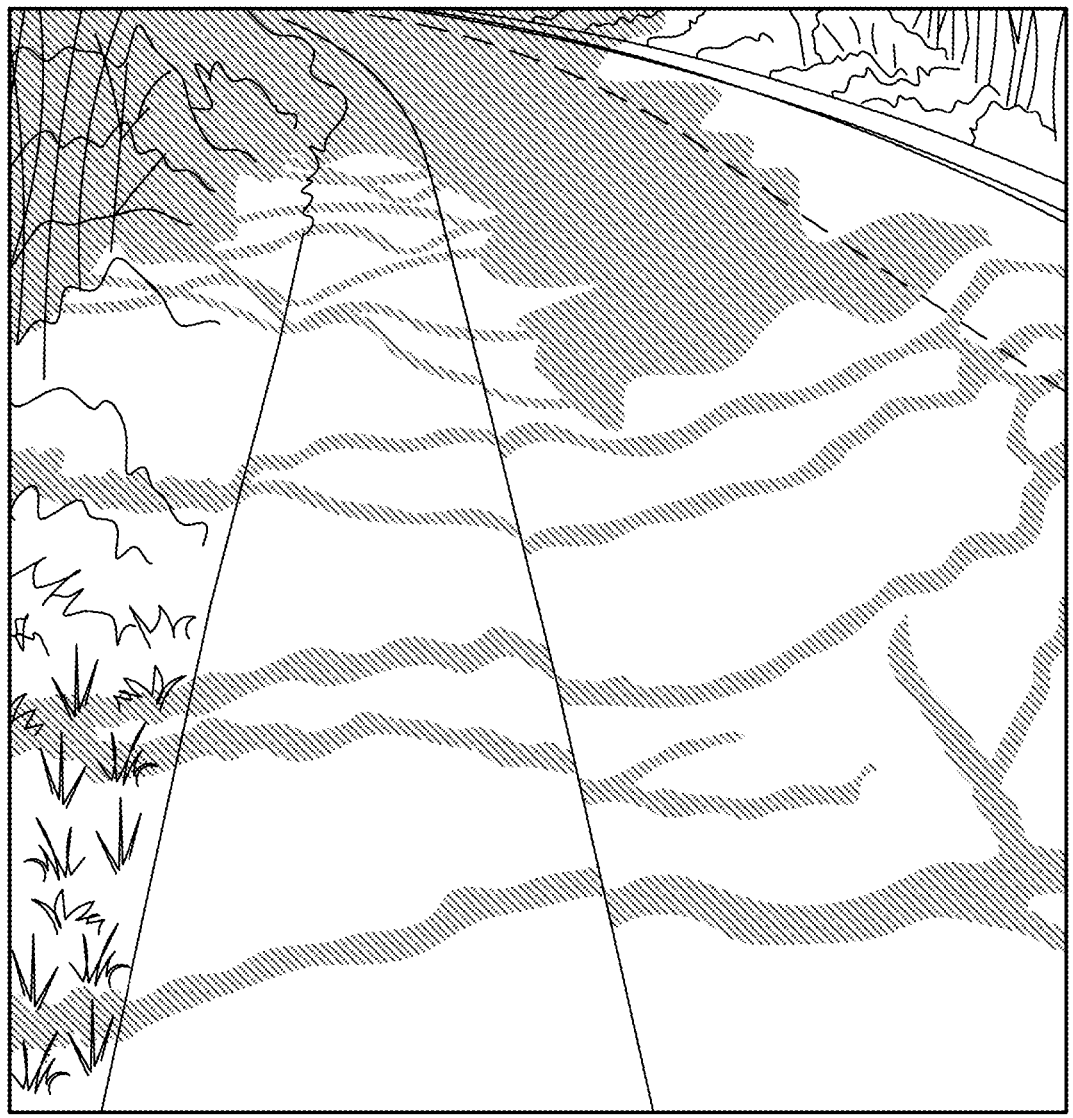
FIG. 6 illustrates a multiple tree texture in an image frame according to a feature of the present invention.

Reference is now made to FIGS. 5c and 5d, which show additional road scenes of successive image frames 15c and 15d captured by processor 30 from camera 12 mounted in host vehicle 18, according to features of the present invention. In image frame 15c of FIG. 5c, tree 50 is bent by wind away from host vehicle 18 and in image frame 15d of FIG. 5d, tree 50 is bent by wind toward from host vehicle 18. Image motion of the respective shadows between image frames 15c and 15d is not identical with and less than image motion of the road and a structure-from-motion algorithm may interpret image motion of the moving tree shadow as hazard or depression in the road of some depth. Such a detection would be a false positive detection. Another example of road shadows caused by shrubs is shown in FIG. 6 in which motion of the shadows due to wind may result in false positive detection using Structure-from-Motion techniques.

Moving shadows from trees are examples of unstructured shadow motion. The direction of motion is not necessarily in the direction of the focus of expansion (FOE) and the direction changes in sign as the leaves and branches sway in the wind. The following approaches may be used to determine that the image motion is from a moving shadow, does not represent a hazard and a collision warning should be inhibited.

A first approach is to segment out regions where the image flow does not match the general image flow direction away from the focus of expansion (FOE) and/or the sign and magnitude of the image flow changes in some apparently random way due to wind.

For moving shadows from sunlight, it is possible with precise date, time and location information to find one or more lines in image frame 15 between the shadow and the candidate image of an object suspected to create the shadow. A search along such lines may be performed to correlate the image motion of the object casting the shadow and the motion of the shadow. Alternatively, if many image lines from moving points suspected as being part of moving shadows all originate from the same candidate image of an object, then it is likely that the moving points are in fact part of from moving shadows being cast by the object.

Shadows at night or twilight may originate from street lamps. Trees or brush moving under the influence of wind positioned under or near the street lamps may generate moving shadows which may appear to be hazards using a structure-from-motion algorithm. Images of street lamps may be recognized by being aligned along lines at the side of the road which meet at the focus of expansion and have an image flow characteristic of street lamps in which the vertical image coordinate y moves according to equation 2 above with Y being the difference between height of the street lamp and the camera height. Lines may be drawn between the shadow points, the image of the tree casting the shadow and the image of the street lamp which are a strong indication that the moving shadows are not hazards in the road.

In addition texture analysis may be performed on the candidate image to see if the candidate image has leaf and/or branch texture. Texture analysis may also be performed in the texture on the road. Even though tree shadows may extend to a few meters on the road, due to foreshortening the vertical extent of the shadow in the image is quite small. If the moving shadows are large in vertical image coordinate y and the shadows likely originate from many trees and the motion is not expected to be uniform over the entire shadow. An example of multiple tree texture on the road surface is shown in FIG. 6.

Reference is now made again to FIGS. 5c and 5d. A lane mark may be detected using an output from lane departure warning LDW 21 algorithm. The detected lane mark leads into a moving shadow (of tree 50) in which image motion is detected. Moreover, as shown in FIGS. 5c and 5d the shadow moves over different portion of a broken lane marker. These are strong indications that the moving image region is a moving shadow and not a hazard.

Thus, it is possible with various methods to distinguish between image flow of a moving object or static hazard in the road, from image flow created by moving shadows of trees or bushes.

Figure 7A:
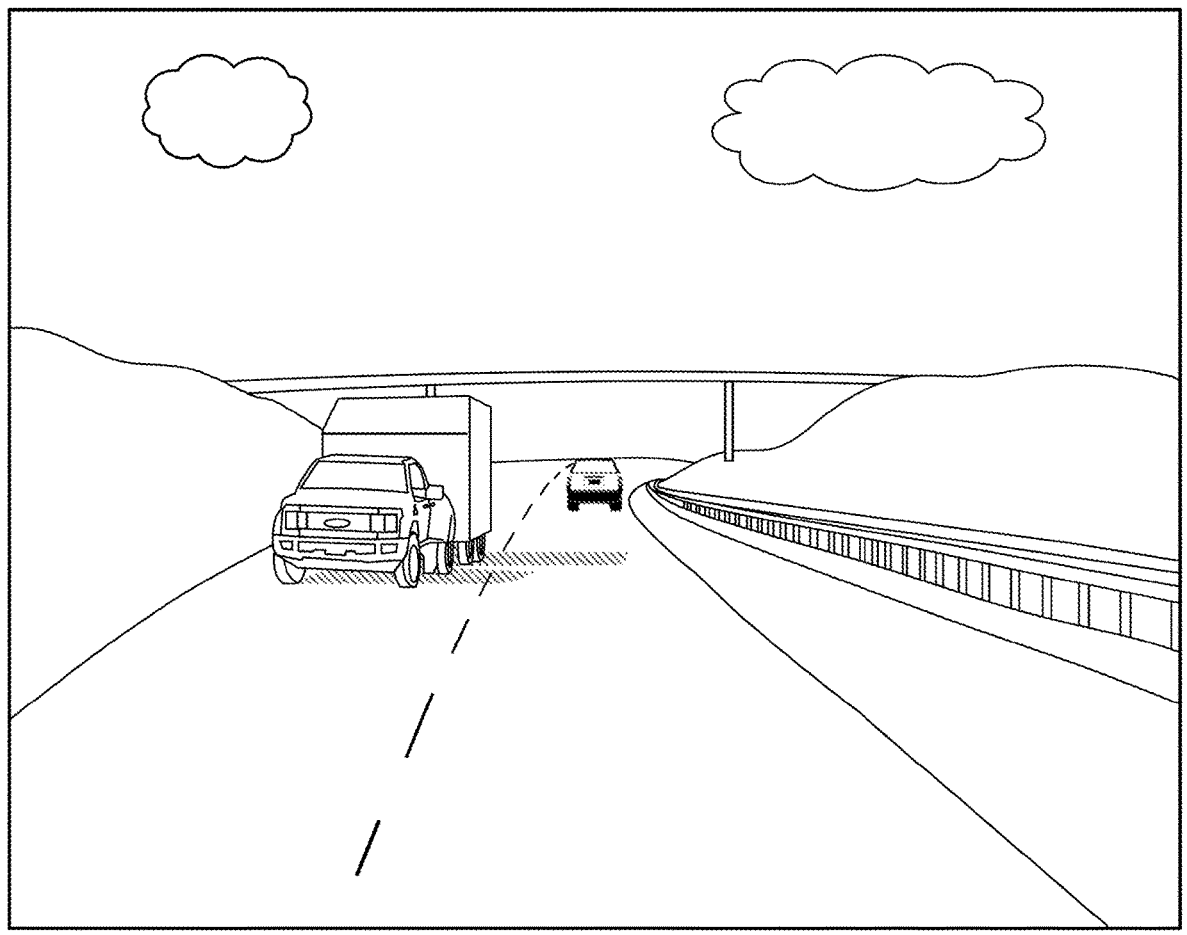
FIG. 7a illustrates an image frame showing an oncoming vehicle and trailer in an adjacent lane creating a moving shadow in the lane of host vehicle, according to a feature of the present invention.

Reference is now made to FIG. 7a which includes an image frame 15 showing an oncoming vehicle and trailer in an adjacent lane creating a moving shadow in the lane of host vehicle 18, illustrating a feature of the present invention. The shadow of the oncoming vehicle in the adjacent lane as shown often appears as a dark horizontal strip moving towards host vehicle 18, the closer (bottom) edge of the shadow and the farther (upper) edge may be considered. A vehicle with a complex shape might produce more than two horizontal edges (in this example two pairs of moving edges are visible). The image motion of the shadows on the road may correspond to a static object of a certain height H and distance Z. If tracked over multiple frames 15, height H and distance Z remain consistent and appear to be a hazard of height H in the road to a structure-from-motion algorithm. Since the moving shadow is moving towards host vehicle 18 a structure-from-motion algorithm may incorrectly interpret the moving shadow to be a hazard of finite height H above the road plane.

Figure 7B:
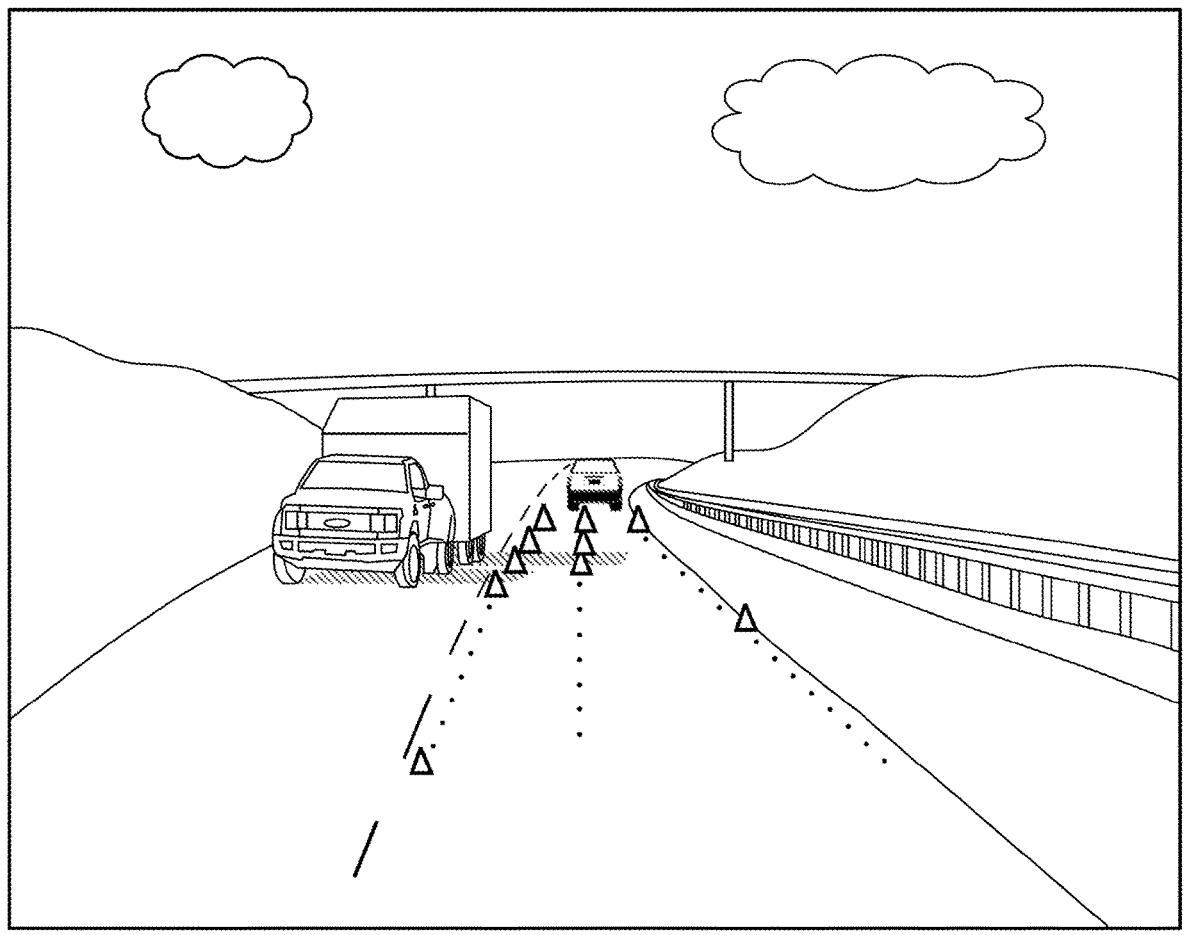

Specifically, reference is now also made to FIG. 7b which shows tracked points on the road plane, according to teachings of US20150086080 for the respective shadows of the vehicle and the trailer illustrated in FIG. 7a. The tracked points marked with triangles near the shadow regions of the oncoming vehicle and its trailer fit the road plane model but have strong residual motion. Thus the shadows associated with the oncoming vehicle and trailer appear as false hazards according the teachings of US20150086080.

The discussion that follows of methods for differentiating between a moving shadow and a real hazard is presented using vehicles as an example but may be applied equally to pedestrians.

Figure 7C:
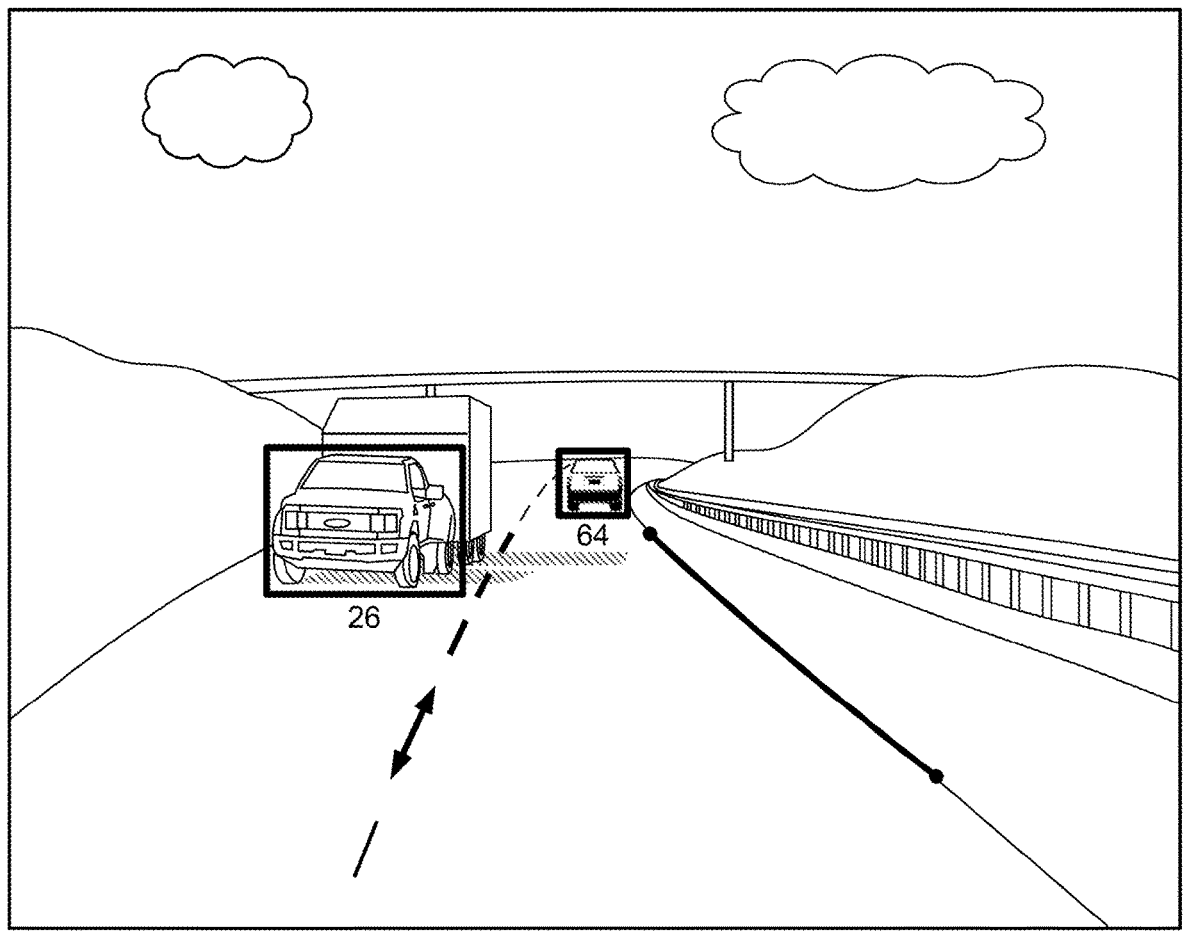
FIG. 7c which includes the image frame of FIG. 7a and illustrates further features of the present invention.

Differentiation between a moving shadow and a real hazard may be accomplished according to different embodiments of the present invention as follows:

- If the oncoming vehicle is traveling at a similar speed as host vehicle 18, the shadow image flow is double the image flow of the road plane and the shadow appears as a static object of half camera height or H/2. Shadows from oncoming vehicles may be rejected as hazards by filtering out apparent objects of height above a threshold, such as 0.5 meters for example.
- Lane detection algorithms included in lane departure warning 21 may be used to detect lane marks and individual lane mark segments of from image frames 15. Reference is made to FIG. 7c which illustrates features of the present invention. LDW 21 detected a solid lane mark to the right of host vehicle 18 and lead vehicle 64 as shown with a long line with double arrows. To the left of host vehicle 18 are three detected lane mark segments which indicate the middle of the road. If such a lane mark segment passes through a moving image patch, the moving image patch is likely a moving shadow and not a hazard. Furthermore, if the image motion is similar on both sides of the lane mark then there is an even stronger indication that the image patch is a shadow of an oncoming vehicle 26.
- As noted above, the moving shadow may appear as a static object protruding from the road and it is possible to verify that the moving shadow is not in fact a real object. The bottom of such an hypothesized object may be projected onto the image. At that location in the image significant horizontal texture such as an edge is expected and the motion of that texture should correspond to the image motion of the road. Or in the terminology of US20150086080 the residual image motion should be zero. Thus the upper edge of the moving shadow will be rejected because of the texture below it, at the hypothesized bottom location is not stationary. The lower edge of the shadow is rejected because, in most cases, there is no strong horizontal texture at the projected ground point.

A hazard has strong horizontal texture so the patch should have a significant horizontal edge. An edge detection may be performed and the number of horizontal edge points in a patch and in each row of the patch may be counted. A good horizontal edge should have a cluster of horizontal edge points in one or two adjacent rows. The patch used to count edge points can have more rows and/or columns than the patch used for tracking.

A hazard should have a horizontal edge both at the top and where it touches the road. The edge on the road should have no residual flow associated with it.

1. For each candidate grid point compute the distance (Z) and height (H).
2. Compute image height (h) of the hazard candidate: h=fH/Z.
3. Search a region centered h pixels below the candidate grid point for a significant horizontal edge.
4. Track region to see if residual motion is stationary.
5. Residual motion (image motion not attributable to image motion of the road plane) and strength of edge are features that can be used to verify the candidate.

Conversely, the edge in the image can be suspected as being a moving shadow of a vehicle and this hypothesis may be tested using DAS system 16 running vehicle detection to see if it is associated with a detected vehicle. Reference is still made to FIG. 7c which illustrates further features of the present invention. Driver assistance systems such as vehicle detection included in forward collision warning FCW 22 may be used to detect vehicles associated with moving image patches. FIG. 7c shows the typical output of system 16. In FIG. 7c an oncoming vehicle 26 is shown as detected and also a lead vehicle 64 is shown as detected. Correlated changes in respective image coordinates of an image of vehicle and of a moving image patch of the road may indicate that the moving image patch is an image of a moving shadow cast by the vehicle and not a real hazard in the road.

Points that exhibit significant residual flow (image flow not attributable to a planar road) are suspect hazard points. However, according to a second hypothesis the suspect hazard points might be moving shadows on the planar surface. Using the ground plane constraint, the distance to the hypothesized shadow can be computed in the two images: $Z_i=fH/(y_i-y0_i)$, where $y_i$, i=1, 2 is the image row location of the shadow and $y0_i$, i=1, 2 is the horizon location, or vanishing row of the road plane, in that image. The hypothesized shadow computed in the two images gives distance Z and relative speed and can be used to match up with detected targets (vehicles) that have similar distance and relative speed. If the hypothesized shadow matches in distance and/or relative speed to a detected target, the hypothesized shadow is accepted and a hazard warning is inhibited.

An association can make use of the sun location and shadow direction to associate only with targets to the left or right of the hypothesized shadow. The target list can come from vehicle detection performed using camera 12 or from a second camera with a different, often wider, field of view. The targets can come also from Radar or Lidar. The target vehicle might have left the field of view (FOV) before the shadow is in the region of the road where hazard detection is being performed. The targets vehicle's presence can be maintained till the previously measured distance and speed indicate that the target vehicle is too far out of range to affect the scene.

Figure 8:
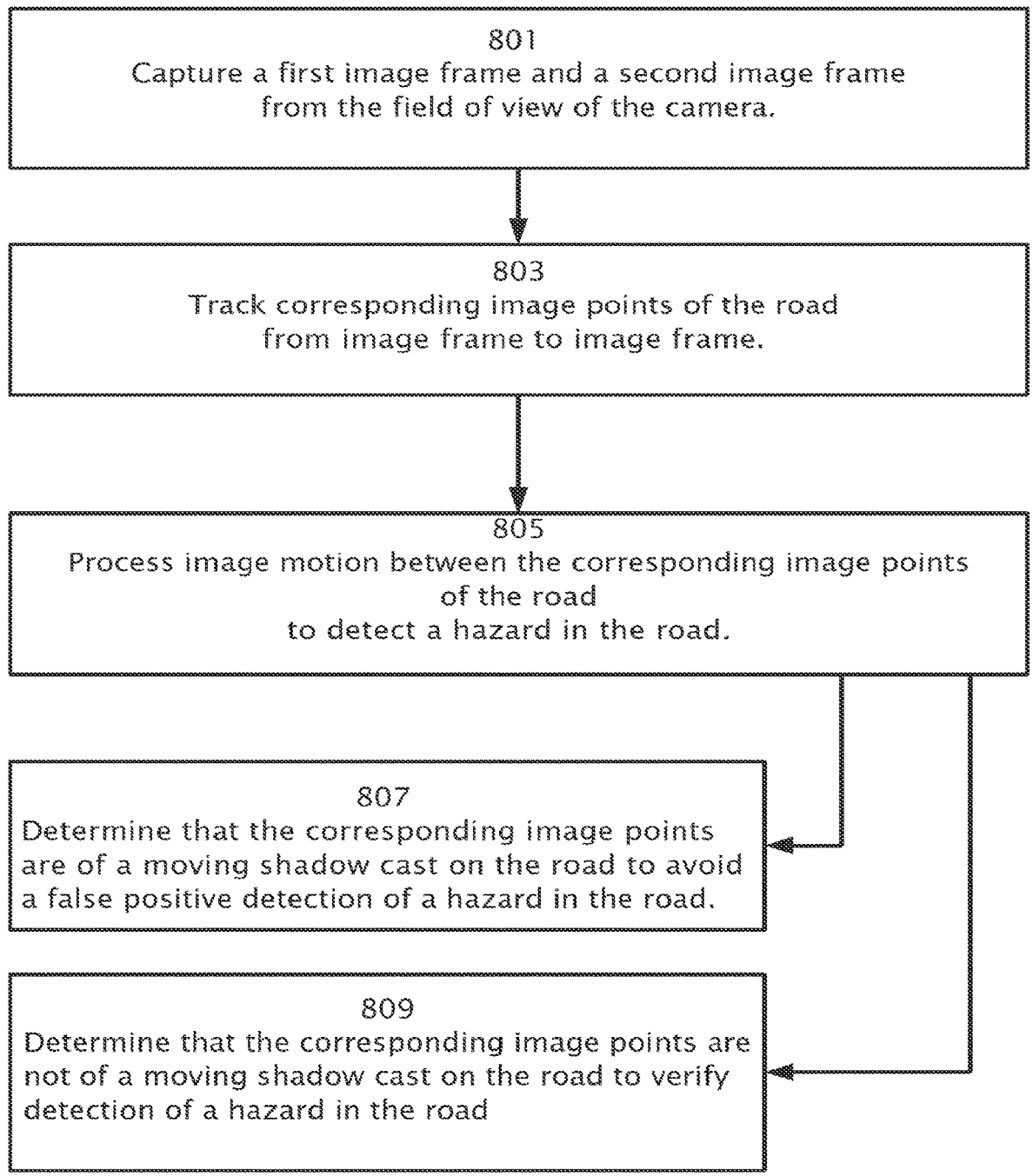
FIG. 8 includes a flow diagram of a method, according to features of the present invention.

In summary, reference is now made to FIG. 8, which includes a flow diagram illustrating a method according to features of the present invention.

Image frames 15 are captured (step 801) from the field of view of camera 12. Corresponding image points of the road are tracked (step 803) from image frame 15 to image frame 15. Image motion between the corresponding image points of the road is processed (step 805) to detect a hazard in the road. If a moving shadow is cast on the road, it is determined (step 807) that the corresponding image points are of the moving shadow to avoid a false positive detection of a hazard in the road. Alternatively, or in addition it may be determined (step 809) that the corresponding image points are not of a moving shadow cast on the road to verify detection of a hazard in the road.

The term "warping" as used herein refers to a transform from image space to image space.

The term "corresponding" as used herein refers to matching image points in different image frames which are found to be of the same object point.

The term "image texture" or "texture" as used herein refers to intensity, brightness or grayscale changes along a line or curve in an image frame.

The term "focus of expansion" (FOE) as used herein refers to a point in the image flow from which all image motion appears to emanate.

The indefinite articles "a", "an" is used herein, such as "an image" has the meaning of "one or more" that is "one or more images".

Although selected features of the present invention have been shown and described, it is to be understood the present invention is not limited to the described features.

What is claimed is:

1. A computerized method for processing images captured by a camera mountable in a host vehicle while the host vehicle is moving, the method comprising:
   capturing a first image frame and a second image frame from a field of view of the camera;
   tracking corresponding image points from the first image frame to the second image frame;
   detecting, from the tracked corresponding image points and based on a comparison of the first image frame to the second image frame, a first plurality of image points associated with a suspect hazard of a road;
   detecting, from the tracked corresponding image points, a second plurality of image points associated with a moving vehicle;
   determining first motion between the first plurality of image points and second motion between the second plurality of image points; and
   determining that the first motion is associated with a moving shadow cast from the moving vehicle based on a correlation between the first motion and the second motion.

2. The method of claim 1, wherein determining that the first motion is associated with a moving shadow cast from the moving vehicle is further based on a distance between the host vehicle and the suspect hazard of the road.

3. The method of claim 2, further comprising:
   hypothesizing that the first motion is due to a hypothetical moving shadow cast from the moving vehicle;
   determining a first distance between the host vehicle and the hypothetical moving shadow;
   determining a second distance between the host vehicle and the moving vehicle; and
   confirming the hypothesis that the first motion is due to the moving shadow cast from the moving vehicle based on a correlation between the first distance and the second distance.

4. The method of claim 3, further comprising:
   determining the first distance matches with the second distance; and
   in response to determining the first distance matches with the second distance, confirming the hypothesis that the first motion is due to the moving shadow cast from the moving vehicle.

5. The method of claim 1, further comprising:
   hypothesizing that the first motion is due to a hypothetical moving shadow cast from the moving vehicle;
   determining a relative speed between the host vehicle and the moving vehicle;
   identifying motion of points on the road for the relative speed between the host vehicle and the moving vehicle;
   measuring the first motion;
   comparing the measured first motion to the identified motion for the relative speed between the host vehicle and the moving vehicle; and
   confirming the hypothesis that the moving image points are of a moving shadow cast from the moving vehicle if the measured motion matches the identified motion.

6. The method of claim 1, further comprising:
   hypothesizing that the first motion is due to a hypothetical moving shadow cast from the moving vehicle;
   determining a first relative speed between the host vehicle and the hypothetical moving shadow;
   determining a second relative speed between the host vehicle and the moving vehicle; and
   confirming the hypothesis that the first motion is due to the moving shadow cast from the moving vehicle based on a correlation between the first relative speed and the second relative speed.

7. The method of claim 6, further comprising:
   determining the first relative speed matches with the second relative speed; and
   in response to determining the first relative speed matches with the second relative speed, confirming the hypothesis that the first motion is due to the moving shadow cast from the moving vehicle.

8. A system for a host vehicle, the system comprising:
   a memory storing instructions; and
   a processor configured to execute the instructions to cause the processor to:
   capture a first image frame and a second image frame from a field of view of the camera;
   track corresponding image points from the first image frame to the second image frame;
   detect, from the tracked corresponding image points and based on a comparison of the first image frame to the second image frame, a first plurality of image points associated with a suspect hazard of a road;
   detect, from the tracked corresponding image points, a second plurality of image points associated with a moving vehicle;
   determine first motion between the first plurality of image points and second motion between the second plurality of image points; and
   determine that the first motion is associated with a moving shadow cast from the moving vehicle based on a correlation between the first motion and the second motion.

9. The system of claim 8, wherein the processor is further configured to execute the instructions to cause the processor to determine that the first motion is associated with a moving shadow cast from the moving vehicle based on a distance between the host vehicle and the suspect hazard of the road.

10. The system of claim 9, wherein the processor is further configured to execute the instructions to cause the processor to:
    hypothesize that the first motion is due to a hypothetical moving shadow cast from the moving vehicle;
    determine a first distance between the host vehicle and the hypothetical moving shadow;
    determine a second distance between the host vehicle and the moving vehicle; and
    confirm the hypothesis that the first motion is due to the moving shadow cast from the moving vehicle based on a correlation between the first distance and the second distance.

11. The system of claim 9, wherein the processor is further configured to execute the instructions to cause the processor to:
    determine the first distance matches with the second distance; and
    in response to determining the first distance matches with the second distance, confirm the hypothesis that the first motion is due to the moving shadow cast from the moving vehicle.

12. The system of claim 8, wherein the processor is further configured to execute the instructions to cause the processor to:
    hypothesize that the first motion is due to a hypothetical moving shadow cast from the moving vehicle;
    determine a relative speed between the host vehicle and the moving vehicle;
    identify motion of points on the road for the relative speed between the host vehicle and the moving vehicle;
    measure the first motion;
    compare the measured first motion to the identified motion for the relative speed between the host vehicle and the moving vehicle; and
    confirm the hypothesis that the moving image points are of a moving shadow cast from the moving vehicle if the measured motion matches the identified motion.

13. The system of claim 8, wherein the processor is further configured to execute the instructions to cause the processor to:
    hypothesize that the first motion is due to a hypothetical moving shadow cast from the moving vehicle;
    determine a first relative speed between the host vehicle and the hypothetical moving shadow;
    determine a second relative speed between the host vehicle and the moving vehicle; and
    confirm the hypothesis that the first motion is due to the moving shadow cast from the moving vehicle based on a correlation between the first relative speed and the second relative speed.

14. The system of claim 13, wherein the processor is further configured to execute the instructions to cause the processor to:
    determine the first relative speed matches with the second relative speed; and
    in response to determining the first relative speed matches with the second relative speed, confirm the hypothesis that the first motion is due to the moving shadow cast from the moving vehicle.

15. A non-transitory computer readable medium containing instructions that, when executed by at least one processor, cause the at least one processor to perform operations comprising:
    capturing a first image frame and a second image frame from a field of view of the camera;
    tracking corresponding image points from the first image frame to the second image frame;
    detecting, from the tracked corresponding image points and based on a comparison of the first image frame to the second image frame, a first plurality of image points associated with a suspect hazard of a road;
    detecting, from the tracked corresponding image points, a second plurality of image points associated with a moving vehicle;
    determining first motion between the first plurality of image points and second motion between the second plurality of image points; and
    determining that the first motion is associated with a moving shadow cast from the moving vehicle based on a correlation between the first motion and the second motion.

* * * * *